US012770643B2

(12) United States Patent
Contreras et al.

(10) Patent No.: US 12,770,643 B2
(45) Date of Patent: Oct. 20, 2026

(54) HIGH-SPEED HIGH-VOLTAGE CMOS WRITE DRIVER

(71) Applicant: Western Digital Technologies, Inc., San Jose, CA (US)

(72) Inventors: John T. Contreras, Palo Alto, CA (US); Rehan Zakai, San Ramon, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/226,852

(22) Filed: Jun. 3, 2025

(65) Prior Publication Data

US 2025/0372120 A1 Dec. 4, 2025

Related U.S. Application Data

(60) Provisional application No. 63/655,632, filed on Jun. 4, 2024.

(51) Int. Cl.
*G11B 5/02* (2006.01)
*G11B 5/596* (2006.01)
*G11B 5/00* (2006.01)

(52) U.S. Cl.
CPC ............ *G11B 5/02* (2013.01); *G11B 5/59655* (2013.01); *G11B 2005/0008* (2013.01)

(58) Field of Classification Search
None
See application file for complete search history.

(56) References Cited

U.S. PATENT DOCUMENTS 5,296,975 A 3/1994 Contreras et al.
5,386,328 A * 1/1995 Chiou .................. H03K 17/567 360/68
5,822,141 A * 10/1998 Chung ..................... G11B 5/09 360/68
5,869,988 A * 2/1999 Jusuf ........................ G11B 5/02 327/108
6,201,653 B1 3/2001 Contreras et al.
(Continued)

FOREIGN PATENT DOCUMENTS

CN 111988029 A 11/2020

OTHER PUBLICATIONS

Kawashimo et al., A Low-Power Write Driver for Hard Disk Drives, Digest of Technical Papers, 2005 Symposium on VLSI Circuits, 2005, IEEE, Jul. 25, 2005, 4 pages.
(Continued)

*Primary Examiner* — Fred Tzeng
(74) *Attorney, Agent, or Firm* — NOD Law PC

(57) ABSTRACT

A data storage device comprises a magnetic medium and a head configured to be actuated over the magnetic medium. The head comprises a write element and a write driver configured to generate a write current to be applied to the write element. The write driver comprises a data switch section configured to switchably output low-level signals and high-level signals, and a stationary cascode section configured to receive the low-level signals and high-level signals from the data switch section and to generate a cascode pass through current. The data switch section comprises low voltage CMOS devices and the stationary cascode section comprises high voltage CMOS devices.

22 Claims, 14 Drawing Sheets

(56) References Cited

U.S. PATENT DOCUMENTS

| | | | | |
|---|---|---|---|---|
| 6,246,533 | B1 * | 6/2001 | Davis | H03K 17/6872 |
| 6,297,921 | B1 | 10/2001 | Price, Jr. et al. | |
| 6,356,113 | B1 | 3/2002 | Contreras et al. | |
| 6,388,476 | B1 | 5/2002 | Isobe et al. | |
| 6,429,987 | B1 | 8/2002 | Cheng | |
| 6,583,629 | B1 * | 6/2003 | Stokes | B82Y 25/00 324/632 |
| 7,106,105 | B2 * | 9/2006 | Bryson | H03F 3/2171 326/88 |
| 7,110,198 | B1 * | 9/2006 | Aram | H03K 17/0414 360/68 |
| 7,277,245 | B1 | 10/2007 | Aram et al. | |
| 7,411,755 | B1 | 8/2008 | Aram et al. | |
| 7,417,817 | B1 * | 8/2008 | Aram | G11B 5/02 360/68 |
| 7,619,843 | B2 | 11/2009 | Contreras et al. | |
| 8,643,969 | B2 * | 2/2014 | Mukhopadhyay | G11B 5/022 360/46 |
| 9,153,248 | B1 * | 10/2015 | Contreras | G11B 5/02 |
| 9,275,656 | B1 * | 3/2016 | Contreras | G11B 5/02 |
| 2003/0234996 | A1 * | 12/2003 | Ngo | H03K 17/663 |
| 2005/0207053 | A1 * | 9/2005 | Barnett | G11B 5/09 360/68 |
| 2006/0119970 | A1 * | 6/2006 | Hayashi | G11B 5/02 360/68 |
| 2006/0171054 | A1 * | 8/2006 | Kuehlwein | G11B 5/012 360/68 |
| 2008/0112085 | A1 * | 5/2008 | Contreras | G11B 5/40 360/234.4 |
| 2009/0116134 | A1 * | 5/2009 | Howley | G11B 5/022 360/71 |
| 2010/0238575 | A1 * | 9/2010 | Gleason | G11B 27/36 |
| 2011/0149441 | A1 * | 6/2011 | Alex | G11B 5/02 |
| 2012/0014011 | A1 | 1/2012 | Wilson | |
| 2013/0286499 | A1 | 10/2013 | Mukhopadhyay et al. | |
| 2015/0048866 | A1 | 2/2015 | Rowley | |
| 2016/0260455 | A1 * | 9/2016 | Dina | G11B 20/10222 |
| 2023/0197108 | A1 * | 6/2023 | Poss | G11B 5/027 360/68 |

OTHER PUBLICATIONS

Pashmineh et al., Self-Biasing High-Voltage Driver Based on Standard CMOS with an Adapted Level Shifter for a Wide Range of Supply Voltages, 2015 Nordic Circuits and Systems Conference (NORCAS): NORCHIP & International Symposium on System-on-Chip (SoC), IEEE, Dec. 28, 2015, 4 pages.

PCT, International Search Report and Written Opinion issued in PCT/US2025/032048, Sep. 30, 2025, 11 pages, Published in: IL.

Sara Toktam Pashmineh Azar, Design and Analysis of Integrated CMOS High-Voltage Drivers in Low-Voltage Technologies, Doctoral thesis, https://d-nb.info/1138235660/34, Aug. 1, 2017, 248 pages.

Tamigi et al., An Improved Write Driver for Miniaturized Hard Disk Drives, 2006 25th International Conference on Microelectronics, IEEE, Jul. 10, 2006, 4 pages.

* cited by examiner

HIGH-SPEED HIGH-VOLTAGE CMOS WRITE DRIVER

CLAIM OF PRIORITY UNDER 35 U.S.C. § 119

The present application for patent claims priority to Provisional Application No. 63/655,632 entitled "HIGH-SPEED HIGH-VOLTAGE CMOS WRITE DRIVER" filed Jun. 4, 2024, and assigned to the assignee hereof and hereby expressly incorporated by reference herein.

BACKGROUND

Data storage devices such as disk drives comprise a disk and a head connected to a distal end of an actuator arm that is rotated about a pivot by a heat actuator (e.g., a voice coil motor (VCM)) to position the head radially over the disk. The disk comprises a plurality of radially spaced, concentric tracks for recording user data sectors and servo sectors. The servo sectors comprise head positioning information (e.g., a track address) that is read by the head and processed by a servo control system to control the actuator arm as it seeks from track to track.

FIG. 1 shows a prior art disk format 2 comprising a plurality of servo tracks 4 defined by servo sectors $\mathbf{6}_0$-$\mathbf{6}_N$ recorded around the circumference of each servo track 4. Each servo sector $\mathbf{6}_i$ comprises a preamble 8 for storing a periodic pattern that allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo sector $\mathbf{6}_i$ further comprises groups of servo bursts 14 (e.g., N and Q servo bursts) that are recorded with a predetermined phase relative to one another and relative to the servo track centerlines. The phase-based servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to the head actuator (VCM) to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal is demodulated by a suitable read channel. The data to be written by the write head is typically sent from a system-on-a-chip (SOC) to a write driver on a preamplifier circuit. The preamplifier circuit is typically located on the actuator (VCM) that moves the read/write heads to the selected data tracks on the disks. The write driver generates analog write current pulses that are applied to the inductive coil in the write head to write data by selectively magnetizing the magnetic media of the recording layer on the disk. Registers in the preamplifier circuit can be set to adjust the baseline write current (Iw) magnitude and the overshoot amplitude (OSA) of the write pulses.

SUMMARY

Various aspects of this disclosure provide an architecture for a high-speed high-voltage CMOS write driver.

One aspect of this disclosure is a data storage device comprising a magnetic medium and a head configured to be actuated over the magnetic medium. The head comprises a write element and a write driver configured to generate a write current to be applied to the write element. The write driver comprises a data switch section configured to switchably output low-level signals and high-level signals, and a stationary cascode section configured to receive the low-level signals and high-level signals from the data switch section and to generate a cascode pass through current. In some implementations, the stationary cascode section comprises a high voltage CMOS device configured to generate the cascode pass through current. In some implementations, the data switch section comprises low voltage CMOS devices and the stationary cascode section comprises high voltage CMOS devices.

Another aspect of this disclosure is a preamplifier, where the preamplifier comprises a write driver receiver, a low-level driver, a level shifter, a high-level driver, and a write driver. The write driver receiver is configured to provide a low-level digital data input. The low-level driver is configured to receive the low-level digital data input from the write driver receiver and comprises a digital data input section and a lower data switch section. The digital data input section and the lower data switch section comprise low voltage CMOS devices. The level shifter is configured to fold the low-level digital data input to a high-level digital data input. The high-level driver is configured to receive the high-level digital data input from the level shifter and comprises an upper data switch section. The upper data switch section comprises low voltage CMOS devices. The write driver is coupled to the low-level driver and to the high-level driver and is configured to generate a write current to be applied to the write element. The write driver comprises high voltage CMOS devices. In some implementations, the preamplifier is configured for use in a data storage device having a magnetic medium and a head having a write element configured to be actuated over the magnetic medium.

A further aspect of this disclosure is a method for generating a write current to be applied to a write element of a head configured to be actuated over a magnetic medium of a data storage device. The method comprises switchably outputting, by a data switch section comprising low voltage CMOS devices, low level signals and high-level signals; receiving, by a stationary cascode section comprising high voltage CMOS devices, the low-level signals and the high-level signals; and generating, by the stationary cascode section, a cascode pass through current.

Various additional aspects of this disclosure are depicted and described in the accompanying drawings and the following description.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different figures. The drawings depict illustrative examples of this disclosure and are not limiting in scope.

DETAILED DESCRIPTION

This disclosure provides a high-speed high-voltage write driver architecture utilizing an all-CMOS process with high-voltage devices. This provides a significant cost advantage over the industry standard BiCMOS process, which is typically more than three times the cost of an all-CMOS process, with equivalent or better performance.

Figure 1:
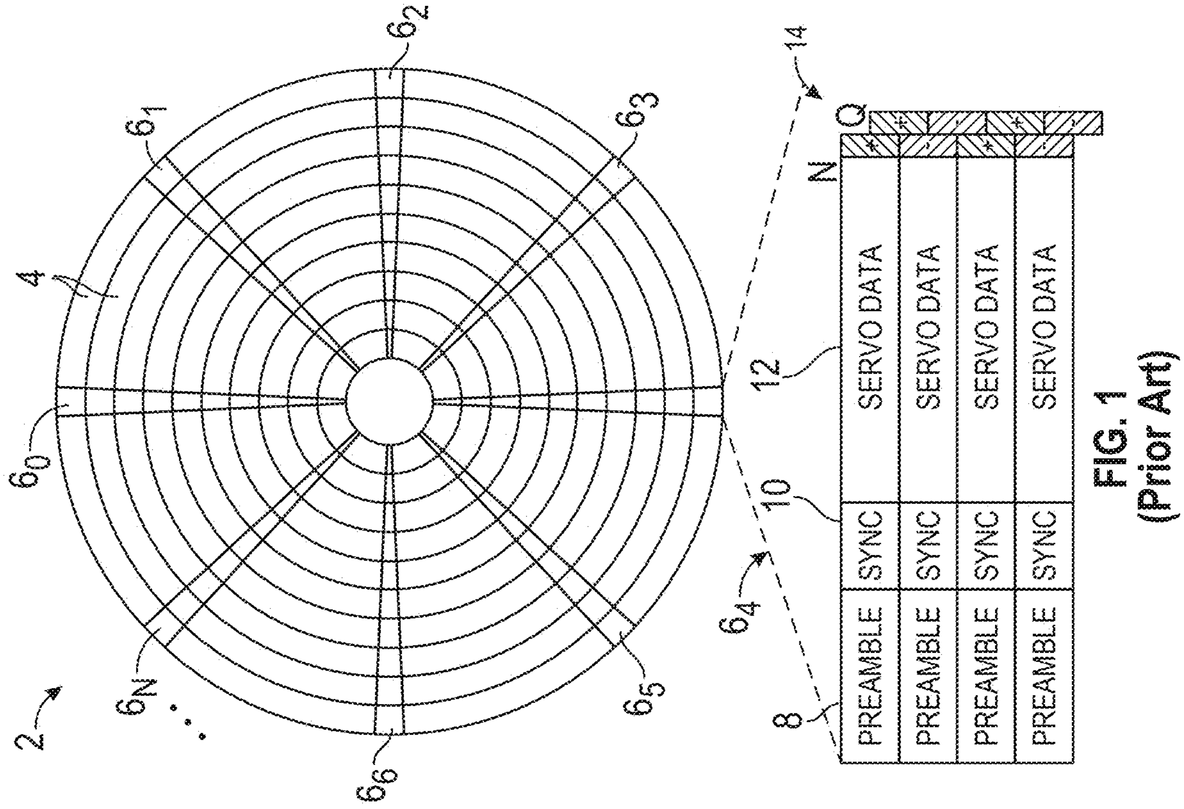
FIG. 1 (Prior Art)
FIG. 1 shows a prior art disk format comprising a plurality of servo tracks defined by servo sectors.
Figure 2A:
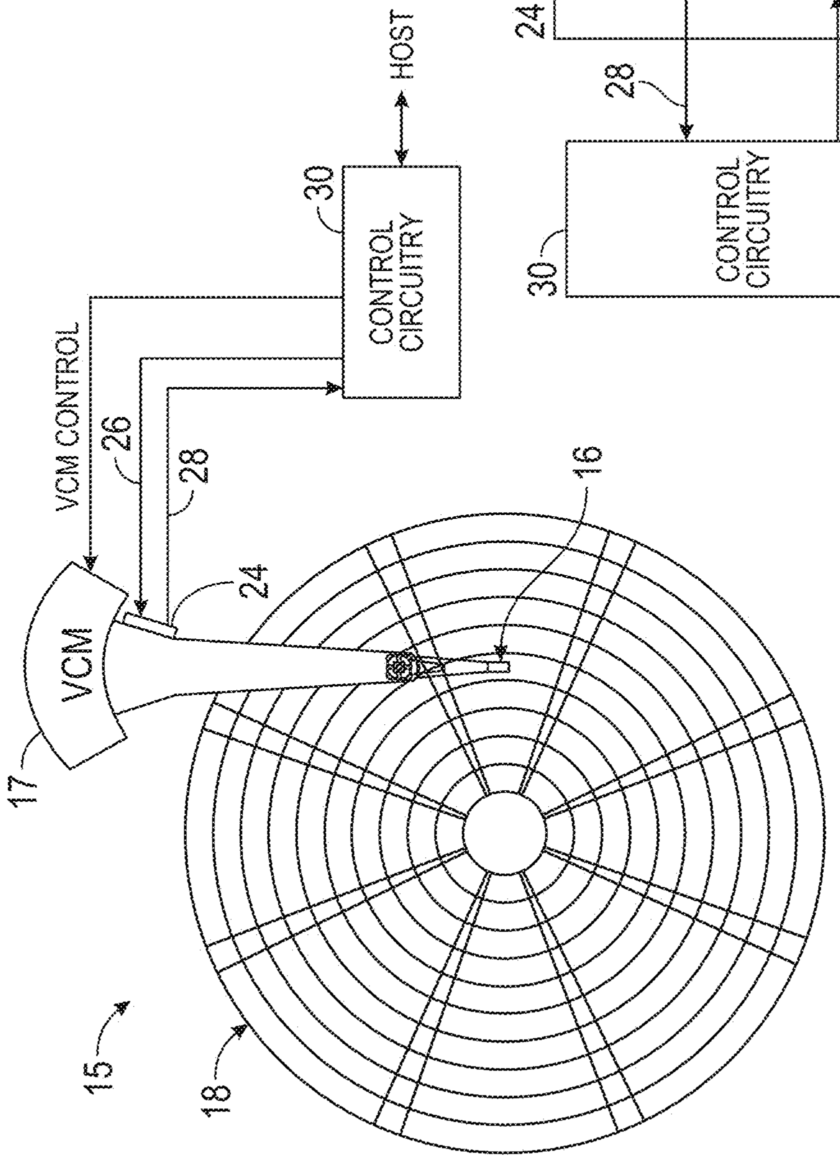
FIG. 2A shows a data storage device in the form of a disk drive comprising a head actuated over a disk and a preamp circuit, in accordance with some embodiments of this disclosure.
Figure 2B:
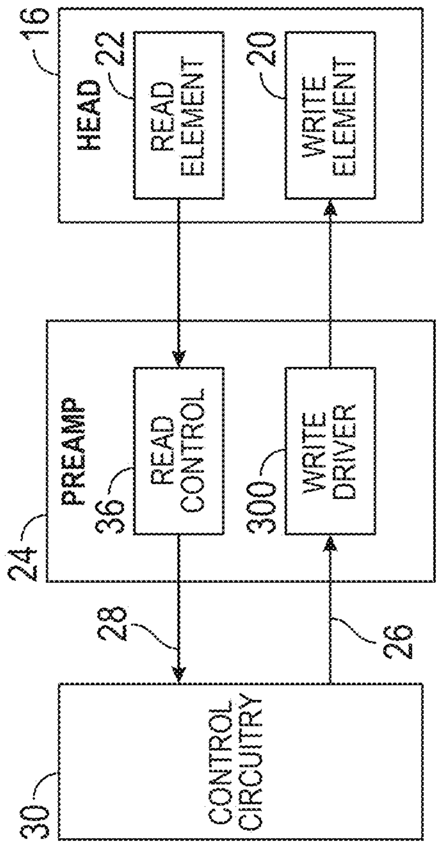
FIG. 2B is a conceptual diagram of the preamp circuit of FIG. 2A, in accordance with some embodiments of this disclosure.

FIG. 2A shows a data storage device in the form of a disk drive 15 comprising a head 16 actuated over a disk 18, in accordance with some embodiments of this disclosure. As shown in FIG. 2B, head 16 comprises a write element 20 and a read element 22. While disk drive 15 is used as an illustrative example herein, this disclosure may be applied to and/or include other types of data storage devices with other types of magnetic media such as tape drives. Disk drive 15 further comprises preamp circuit 24. As shown in FIG. 2A, in one non-limiting example, preamp circuit 24 is located on actuator (VCM) 17 that moves head 16 to selected data tracks on disk 18. Control circuitry 30 is coupled to preamp circuit 24 via write line 26 and read line 28. Preamp circuit 24 includes a write driver circuit 300 that drives write element 20 of head 16, as well as read control circuitry 36 coupled to read element 22 of head 16. In one non-limiting example, control circuitry 30 comprises a system-on-a-chip (SOC).

Figure 3:
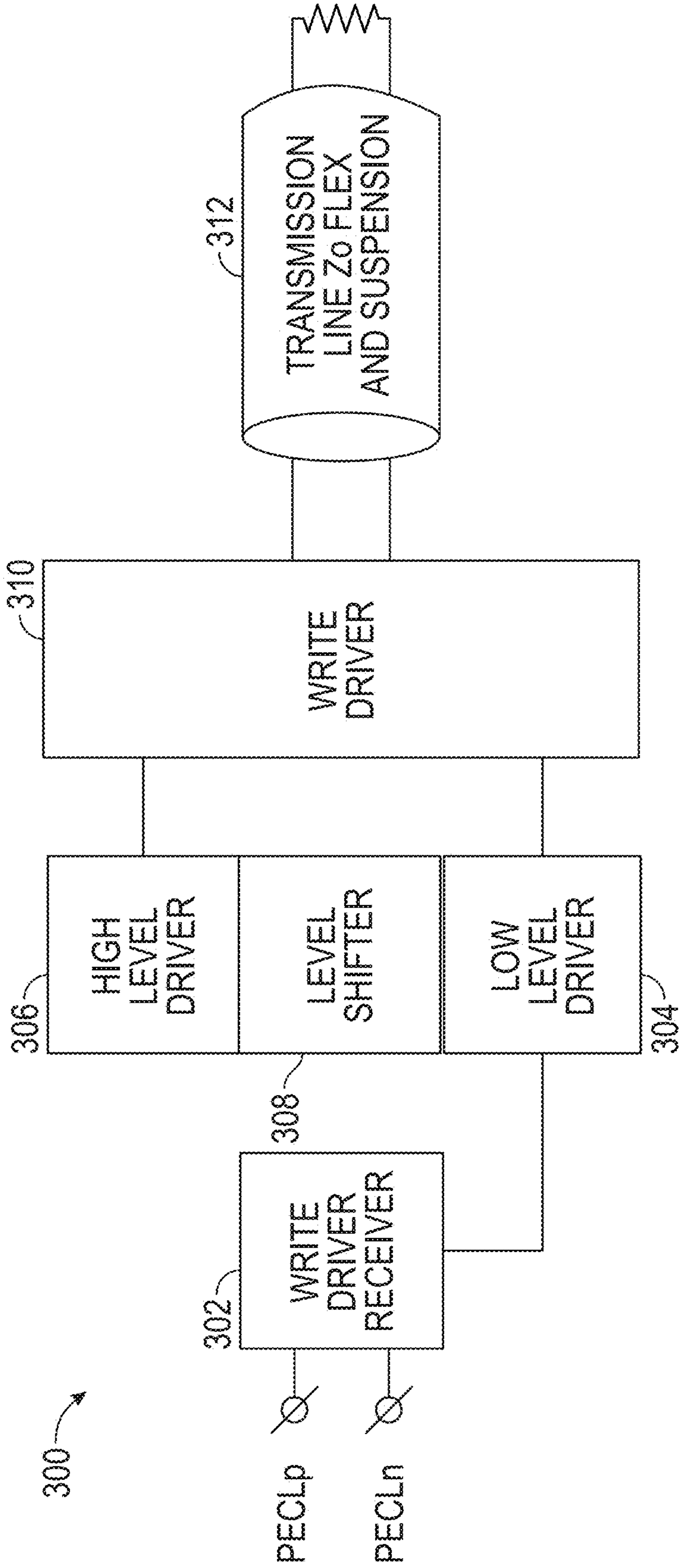
FIG. 3 is a conceptual diagram of a write driver implemented in the preamp circuit of FIG. 2B, in accordance with some embodiments of this disclosure.

FIG. 3 is a conceptual diagram 300 (also referred to as a write driver circuit 300) showing a write driver 310 implemented in preamp circuit 24 of FIG. 2B, in accordance with some embodiments of this disclosure. As shown, FIG. 3 illustrates a write driver receiver 302, low level driver 304, high level driver 306, level shifter 308, write driver 310 and transmission line 312. Write driver receiver 302 receives positive emitter coupled logic (PECL) signals (0.8Vpp) PECLp and PECLn (as used herein suffixes "p" and "n" denotes positive and negative, respectively). The PECL signals may comprise write control signals received from the disk drive's SoC (System on Chip), which covers the overall operations of the drive. In some embodiments, the input signal range is 0 to 1.8V, so 2.5V technology can be used. Write driver receiver 302 folds the input signal from a higher level to a lower level, and outputs the lower-level signal (also denoted as "LL" in the figures and description below) to low level driver 304. Low level driver 304 is a single-path drive to maintain matching, and differential is used to maintain signal balance symmetry. In some embodiments, low level driver 304 utilizes small geometry (e.g., 22 nm, 14 nm, 10 nm, <10 nm, to name a few non-limiting examples), low voltage type NMOS un devices for smaller size. Level shifter 308 folds the lower-level signal of low-level driver for the bottom (Vee) devices to a higher-level signal (also denoted as "HL" in the figures and description below) for high level driver 306 for the upper (Vcc) devices. Thus, level shifter 308 provides parallel higher level (high level driver 306) signals to the corresponding lower level (low level driver 304) signals, which serves to match the signals on both the positive and negative, and essentially mimicking an H-bridge effect. High level driver 306 and low-level driver 304 output a differential signal input to write driver circuitry 310, which outputs a parallel signal to transmission line 312.

Figure 4A:
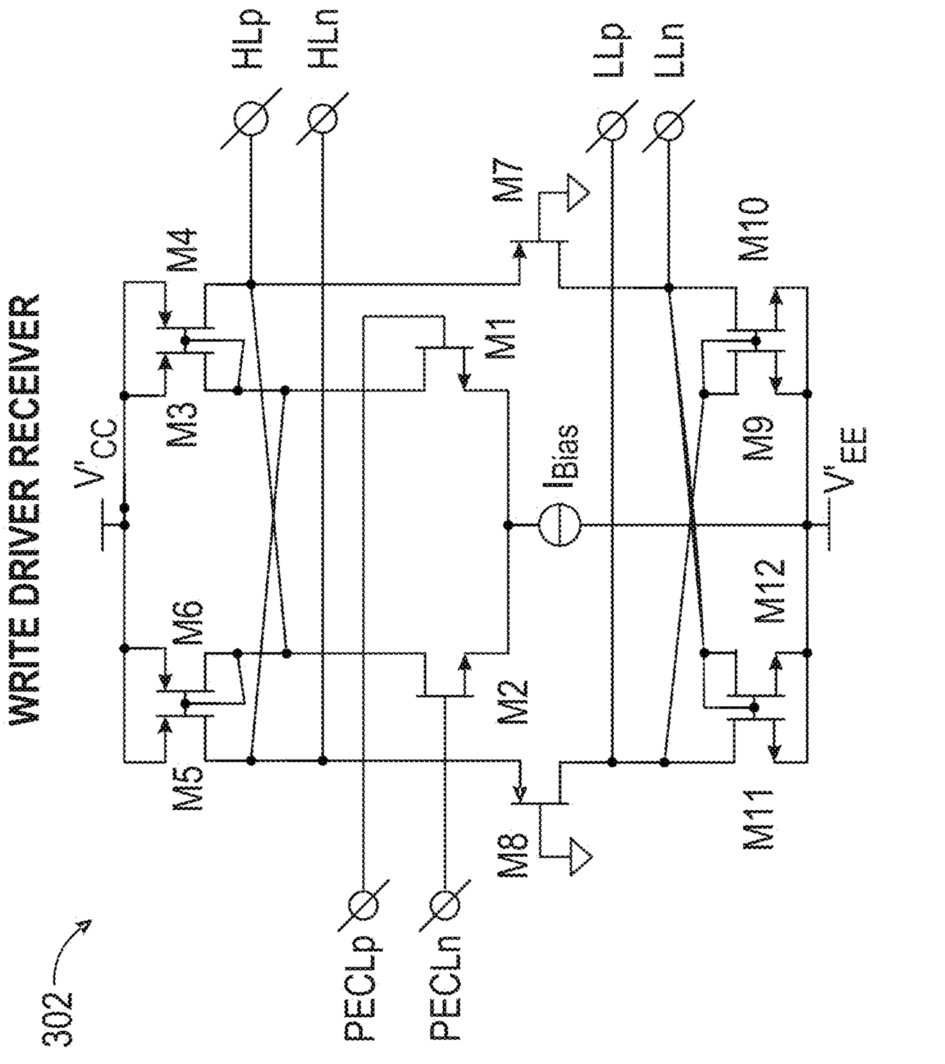
FIG. 4A is a circuit diagram illustrating the architecture of a write driver receiver of the write driver of FIG. 3, in accordance with some embodiments of this disclosure.

FIG. 4A is a circuit diagram illustrating the architecture of write driver receiver 302, in accordance with some embodiments of this disclosure. Receiver 302 receives differential PECL signals (PECLp and PECLn) and generates positive differential logic signals (HLp and HLn) and negative differential logic signals (LLp and LLn). As described with reference to FIG. 6, negative differential logic signals LLp and LLn are supplied to write driver circuit 600 as input digital data signals S and S'. Positive differential logic signals HLp and HLn are used for additional functions such as overshoot and duration control. PECLp is supplied to the gate of NMOS transistor M1, and PECLn is supplied to the gate of NMOS transistor M2. Bias current supply $I_{Bias}$ is coupled between the sources of NMOS transistors M1 and M2 and the negative voltage supply $V'_{EE}$ (typically −3V). The drain of NMOS transistor M1 is coupled to the tied drains of PMOS transistors M3 and M5, and the drain of NMOS transistor M2 is coupled to the tied drains of PMOS transistors M4 and M6.

The sources of PMOS transistors M3, M4, M5 and M6 are coupled to the positive voltage supply $V'_{CC}$ (typically +5V). The gates of PMOS transistors M3 and M4 are coupled to the tied drains of PMOS transistors M3 and M5, and the gates of PMOS transistors M5 and M6 are coupled to the tied drains of PMOS transistor M4 and M6. The tied drains of PMOS transistors M4 and M6 provide the positive differential logic output signal HLp, and the tied drains of PMOS transistors M3 and M5 provide the positive differential logic output signal HLn.

High voltage (HV) PMOS transistors M7 and M8 fold the high frequency signals HLp and HLn to the negative voltage supply. In particular, the source of HV-PMOS transistor M7 is coupled to output signal HLp (the tied drains of PMOS transistor M4 and M6), and the source of HV-PMOS transistor M8 is coupled to output signal HLn (the tied drains of PMOS transistors M3 and M5). The drain of HV-PMOS transistor M8 is coupled to the tied drains of NMOS transistors M11 and M9, and the drain of HV-PMOS transistor M7 is coupled to the tied drains of NMOS transistors M10 and M12. The gates of HV-PMOS transistors M7 and M8 are grounded.

The sources of NMOS transistors M9, M10, M11 and M12 are coupled to the negative voltage supply $V'_{EE}$. The gates of NMOS transistors M9 and M10 are coupled to the tied drains of NMOS transistor M9 and M11, and the gates of NMOS transistors M11 and M12 are coupled to the tied drains of NMOS transistors M10 and M12. The tied drains of NMOS transistors M9 and M11 provide the negative differential logic output signal LLp, and the tied drains of NMOS transistors M10 and M12 provide the negative differential logic output signal LLn.

With respect to write driver receiver 302, it should be noted that the positive voltage supply $V'_{CC}$ and the negative voltage supply $V'_{EE}$ could be regulated to permit use of lower 2.5V devices.

Figure 4B:
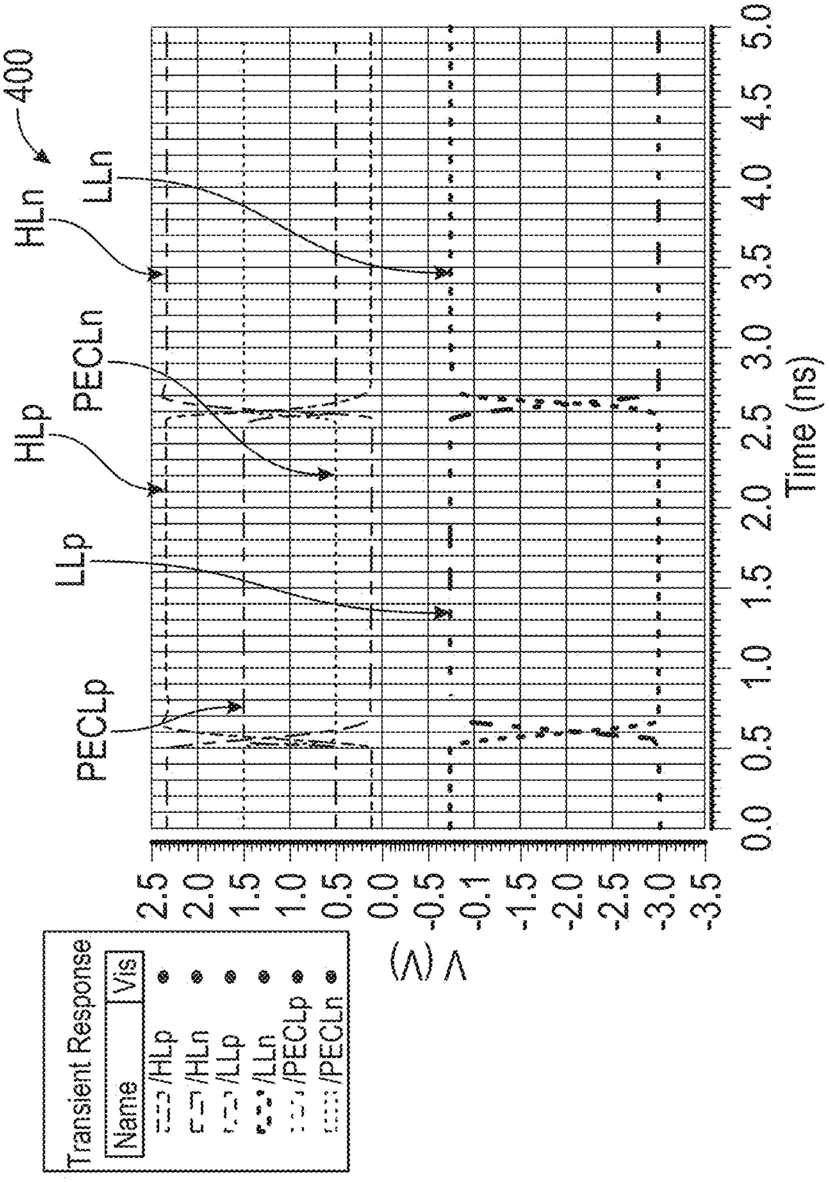
FIG. 4B is a graph showing the input and output signal waveforms of the write driver receiver of FIG. 4A, in accordance with some embodiments of this disclosure.

FIG. 4B is a graph 400 showing the input and output signal waveforms of write driver receiver 302, in accordance with some embodiments of this disclosure. Input signals PECLp and PECLn are differential signals having a high level of approximately 1.5V and a low level of approximately 0.5V. Positive differential logic output signals HLp and HLn have a high level of approximately 2.3V and a low level of approximately 0.1V. Negative differential logic output signals LLp and LLn have a high level of approximately −0.8V and a negative level of approximately −3.0V.

Figure 5B:
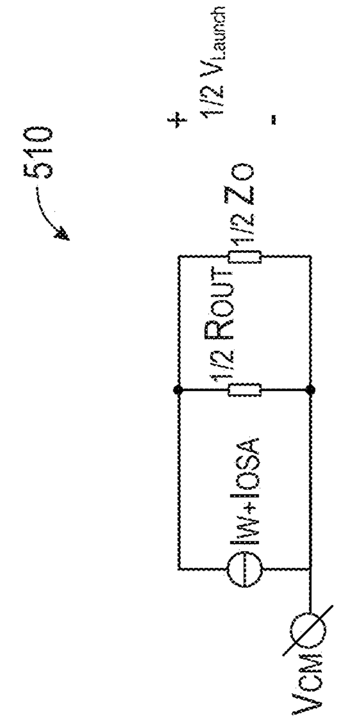
FIGS. 5A and 5B are conceptual equivalent circuit diagrams illustrating design considerations for the output launch voltage ($V_L$) of the write driver, in accordance with some embodiments of this disclosure.
Figure 5A:
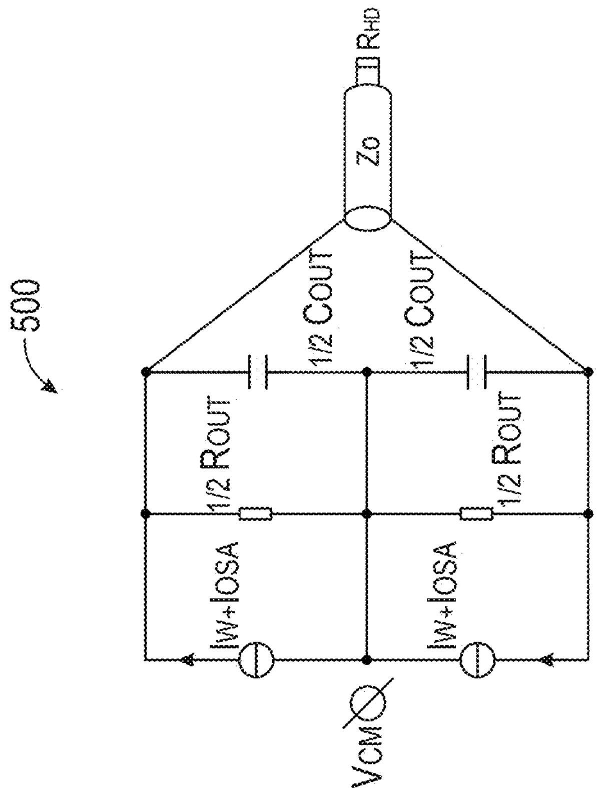

FIGS. 5A and 5B are conceptual equivalent circuit diagrams 500 and 510 illustrating the design considerations for the output launch voltage ($V_{Launch}$) of the write driver circuit 310, in accordance with some embodiments of this disclosure. FIG. 5A represents the common mode and differential mode signals, and FIG. 5B represents only the differential mode signals. The resistance $R_{OUT}$ needs to be matched with the impedance $Z_O$ of the transmission path. $R_{OUT}$ is a programmable passive impedance created by passive resistors and transistor switches to set the $R_{OUT}$ value. Additional parameters include the write current ($I_W$) applied to the write coil of head 16, and an overshoot amplitude (OSA) that is provided to make up for the slow reversal of the magnetic transition in the head (moving from one saturating polarity to another saturating polarity).

FIG. 5A shows, in the top half of equivalent circuit 500, the following elements in parallel: the equivalent current as the sum of the write current $I_W$ and the overshoot amplitude current $I_{OSA}$, the equivalent output resistance as ½ $R_{OUT}$, and the equivalent output capacitance as ½ $C_{OUT}$. The bottom half of the circuit is the same with the source regulated (common mode) voltage $V_{CM}$ between the two equivalent current sources. $V_{CM}$ is typically close to $(V_{CC}-V_{EE})/2+V_{EE}$, so where $V_{CC}$ is +5V and $V_{EE}$ is −3V, $V_{CM}$ is +1V. At the end of the transmission line is the read/write head 16 and its equivalent resistance $R_{HD}$, to which the write current $I_W$ is applied. As can be seen in equivalent circuit 510 of FIG. 5B, ½ of the launch voltage ($V_{LAUNCH}$ or $V_L$) is formed across the parallel elements $I_W+I_{OSA}$, ½ $R_{OUT}$ and ½ $Z_O$. The following relationships can be derived from equivalent circuits 500 and 510:

$$V_L(I_W) = R_{OUT} \times I_W(I_W \text{ Switching} - 2 \times V)$$

$$V_L(OSA) = 1/2R_{OUT} \times I_{OSA}(OSA \text{ Switching} - 1 \times V)$$

$$V_L = V_L(I_W) + V_L(I_{OSA})$$

$$V_{LIMIT} \geq V_L(I_W) + V_L(I_{OSA})$$

$$I_{OSA} \leq 2 \times (V_{LIMIT} - V_L(I_W))/R_{OUT}$$

$$I_{OSA} = 2(V_{LIMIT}/R_{OUT}) - 2(I_W)$$

Figure 5C:
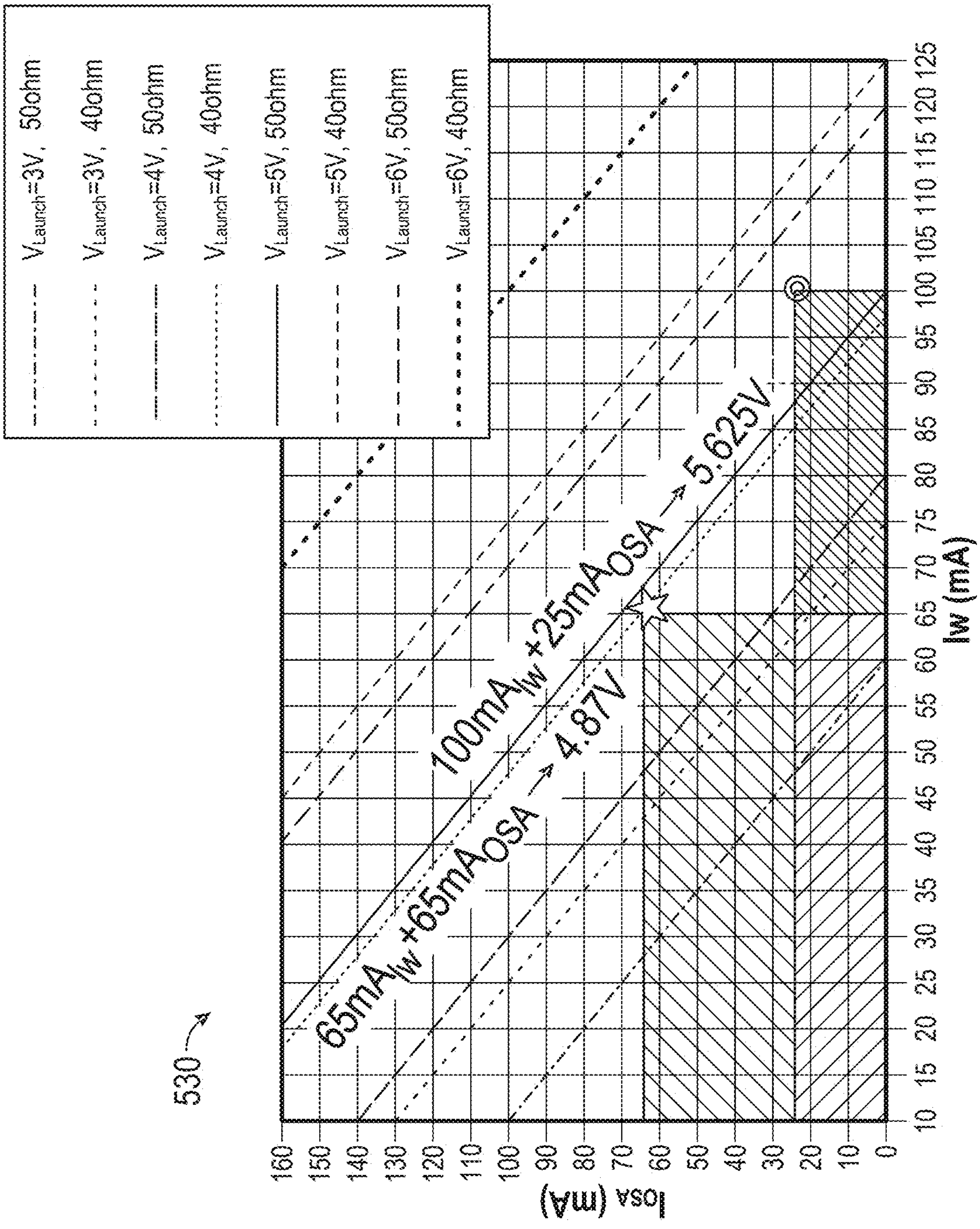
FIG. 5C is a graph showing relationships between launch voltage, output resistance, write current and overshoot amplitude current, in accordance with some embodiments of this disclosure.

FIG. 5C is a graph 530 showing the write current $I_W$ (on the horizontal or x-axis) and the overshoot amplitude current ($I_{OSA}$) on the vertical or y-axis, as it relates to desired combinations of launch voltage ($V_{LAUNCH}$ or $V_L$) and output resistance $R_{OUT}$, as determined by the above relationships. In one non-limiting example, a write current of 65 mA and an overshoot amplitude current of 65 mA, and an output resistance of 50 ohms, will yield a launch voltage of 4.87V. In another non-limiting example, a write current of 100 mA and an overshoot amplitude current of 25 mA, and an output resistance of 50 ohms, will yield a launch voltage of 5.625V.

Figure 6:
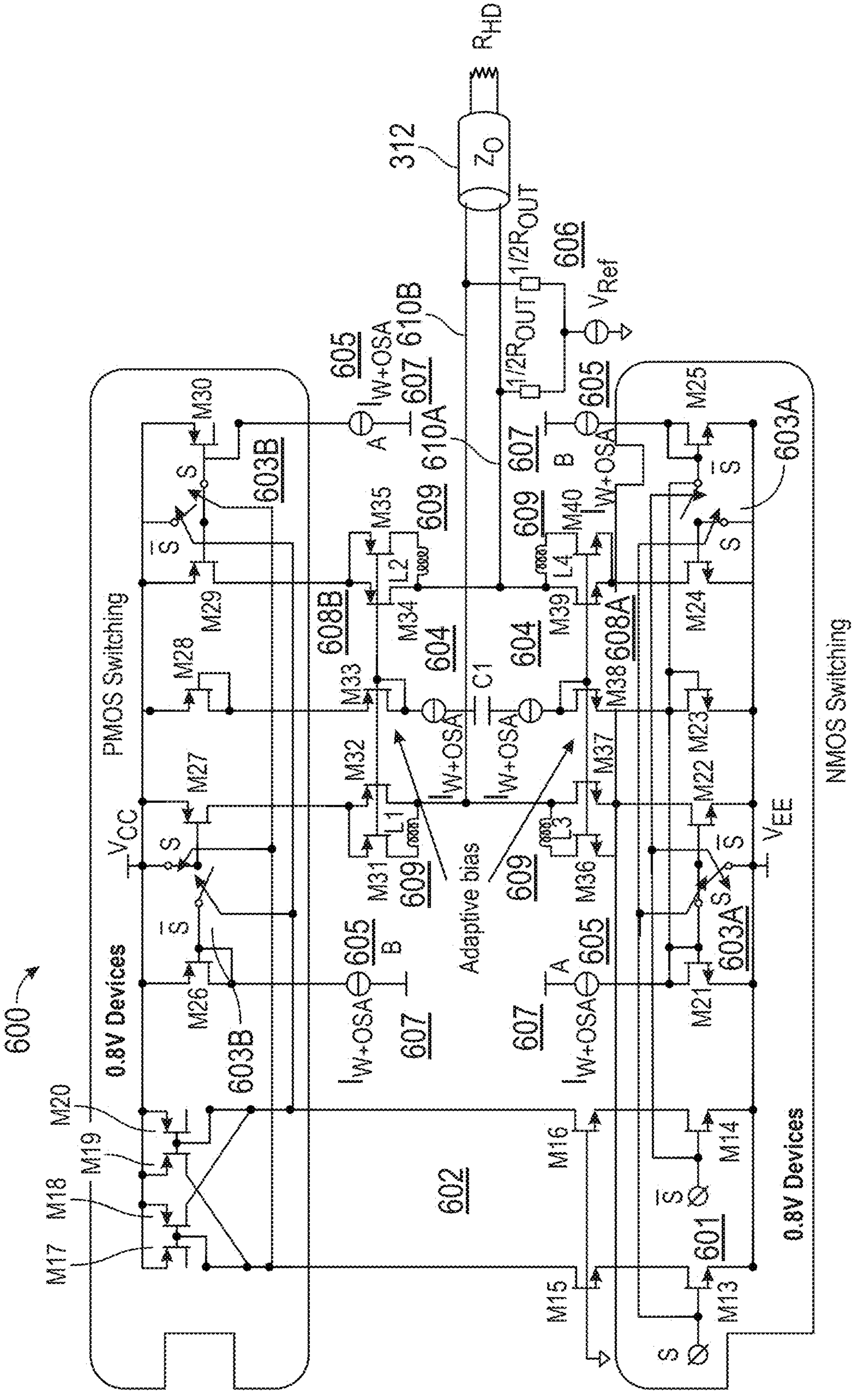
FIG. 6 is a detailed circuit diagram that implements the functions of the write driver of FIG. 3, in accordance with some embodiments of this disclosure.

FIG. 6 is a detailed diagram of a write driver circuit 600 that implements the functions of write driver circuit (300) or the write driver 310 of FIG. 3, in accordance with some embodiments of this disclosure. Write driver circuit 600 has various sections that implement the functions of the write driver circuit 300 and/or the write driver 310 previously described in relation to FIG. 3, as follows: digital data input section 601; level-shifter section 602; data switch section (603A and 603B collectively); (4) adaptive cascode bias section 604; (5) A-B handoff section 605; (6) programmable termination section 606; (7) $I_{W+OSA}$ input section 607; (8) stationary cascode section 608; and (9) distributed inductive compensation section 609.

Digital Data Input Section 601

Digital data input section 601 comprises two NMOS transistors M13 and M14 whose respective gates are coupled to lower-level input digital data signals S and S'. In one implementation, lower-level input digital data signals S and S' are received from write driver receiver 302 (FIG. 3) and correspond to negative differential logic signals LLp and LLn having a high level of approximately −0.8V and a low level of approximately −3.0V (FIG. 4A). The sources of NMOS transistors M13 and M14 are coupled to voltage supply $V_{EE}$. In one non-limiting example NMOS transistors M13 and M14 are low voltage (0.8V) devices, and voltage supply $V_{EE}$ is −3V.

Level Shifter Section 602

Level shifter section 602 corresponds to level shifter 308 of FIG. 3 and functions to fold the lower-level signals (LLp and LLn) of the bottom ($V_{EE}$) devices to higher level signals for the upper ($V_{CC}$) devices. Thus, level shifter section 602 provides parallel higher level (e.g., shown as high-level driver 306 in FIG. 3) signals to the corresponding lower level (e.g., shown as low level driver 304 in FIG. 3) signals, which serves to match the signals on both the positive and negative, and essentially mimicking an H-bridge effect.

Level shifter section 602 comprises high voltage (HV) NMOS transistors M15 and M16, and low voltage (0.8V) PMOS transistors M17, M18, M19 and M20. The sources of NMOS transistors M15 and M16 are coupled to the drains of NMOS transistors M13 and M14. The gates of NMOS transistors M15 and M16 are coupled to ground. The drain of NMOS transistor M15 is coupled to the drains of PMOS transistors M17 and M19, and to the gates of PMOS transistors M17 and M18. The drain of NMOS transistor M16 is coupled to the drains of PMOS transistors M18 and M20, and to the gates of PMOS transistors M19 and M20. The sources of PMOS transistors M17, M18, M19 and M20 are coupled to voltage supply $V_{CC}$. In one non-limiting example, $V_{CC}$ is 5V. As a result of the level shifting operation, the higher-level signal S (HLp) is present on the tied drains of PMOS transistors M17 and M19 (and tied gates of PMOS transistors M17 and M18), and the lower-level signal S' (HLn) is present on the tied drains of PMOS transistors M18 and M20 (and tied gates of PMOS transistors M19 and M20).

Data Switch Sections 603A and 603B

Lower data switch section 603A receives lower-level signals S and S' (LLp and LLn) from digital data input 601, and upper data switch section 603B receives higher-level signals S and S' (HLp and HLn) from level shifter circuit 602. Together, lower data switch section 603A and digital data input section 601 comprise the low-level driver (e.g., low-level driver 304 of FIG. 3). The low voltage NMOS devices of the low-level driver have a switching rise/fall time of approximately 25 ps, in one example implementation. Together, upper data switch section 603B and level shifter section 602 comprise the high-level driver (e.g., high-level driver 306 of FIG. 3). The PMOS devices of the high-level driver have a switching rise/fall time of less than 75 ps, in one example implementation. Lower data switch section 603A drives current to lower stationary cascode section 608A, and upper data switch section 603B drives current to upper stationary cascode section 608B. Thus, an "H-bridge effect" is created, where current goes in one direction and then the other, based on the polarity of the inputs S and S'.

Lower data reference currents and switch section 603A comprise low voltage (0.8V) NMOS transistors M21, M22, M23, M24 and M25, whose sources are coupled to voltage supply $V_{EE}$. Lower-level signals S and S' (LLp and LLn) are switchably applied to the gates of NMOS transistors M21 and M22 and to the gates of NMOS transistors M24 and M25. The gate of NMOS transistor M21, in addition to being switchably coupled to S and S', is tied to its drain. The drain of NMOS transistor M21 is coupled to lower "A" write and OSA current ($I_{W+OSA}$) input section 607 and to the source of high voltage NMOS transistor M38 of lower stationary cascode section 608A. The drain of NMOS transistor M22 is coupled to the sources of high voltage NMOS transistors M36 and M37 of lower stationary cascode section 608A. The gate of NMOS transistor M23 is tied to its drain. The drain of NMOS transistor M23 is tied to lower "A" $I_{W+OSA}$ input section 607 and to the source of high voltage NMOS transistor M38 of lower stationary cascode section 608A. The drain of NMOS transistor M24 is tied to the sources of high voltage NMOS transistors M39 and M40 of lower stationary cascode section 608A. The gate of NMOS transistor M25 is tied to its drain, is switchably coupled to lower-level signals S and S' and is coupled to lower "B" $I_{W+OSA}$ input section 607 and to the source of high voltage NMOS transistor M38 of lower stationary cascode section 608A. The drain of NMOS transistor M25 is coupled to lower "B" $I_{W+OSA}$ input section 607.

Upper data switch section 603B comprises low voltage (0.8V) PMOS transistors M26, M27, M28, M29 and M30, whose sources are coupled to the voltage supply $V_{CC}$. Higher-level signals S and S' (HLp and HLn) are switchably applied from level shifter section 602 to the gates of PMOS transistors M26 and M27 and to the gates of PMOS transistors M29 and M30. The gate of PMOS transistor M26, in addition to being switchably coupled to S and S', is tied to its drain. The drain of PMOS transistor M26 is coupled to upper "B" $I_{W+OSA}$ input section 607. The drain of PMOS transistor M27 is coupled to the sources of high voltage PMOS transistors M31 and M32 of upper stationary cascode section 608B. The gate of PMOS transistor M28 is tied to its drain. The drain of PMOS transistor M28 is tied to the source of high voltage PMOS transistor M33 of upper stationary cascode section 608B. The drain of PMOS transistor M29 is tied to the sources of high voltage PMOS transistors M34 and M35 of upper stationary cascode section 608B. The gate of PMOS transistor M30 is tied to its drain, which is coupled to the upper "A" $I_{W+OSA}$ input section 607.

Adaptive Cascode Bias 604

Adaptive cascode bias section 604 "adapts" for the $I_W$ and $I_{OSA}$ current settings. A scaled value of the programmable $I_{W+OSA}$ is used to create an adaptive cascode bias current 604, that creates the reference voltage applied to the tied gates of lower stationary cascode NMOS transistors M36, M37, M38, M39 and M40, as well as to the drain of lower stationary cascode NMOS transistor M38. Likewise, the programmable $I_{W+OSA}$ adaptive cascode bias current 604 is applied to the tied gates of upper stationary cascode PMOS transistors M31, M32, M33, M34 and M35, as well as to the drain of upper stationary cascode PMOS transistor M33. Capacitor C1 is coupled between the adaptive cascode bias current inputs to the lower and stationary cascode sections 608A and 608B.

A-B Handoff Circuits 605

Figure 7A:
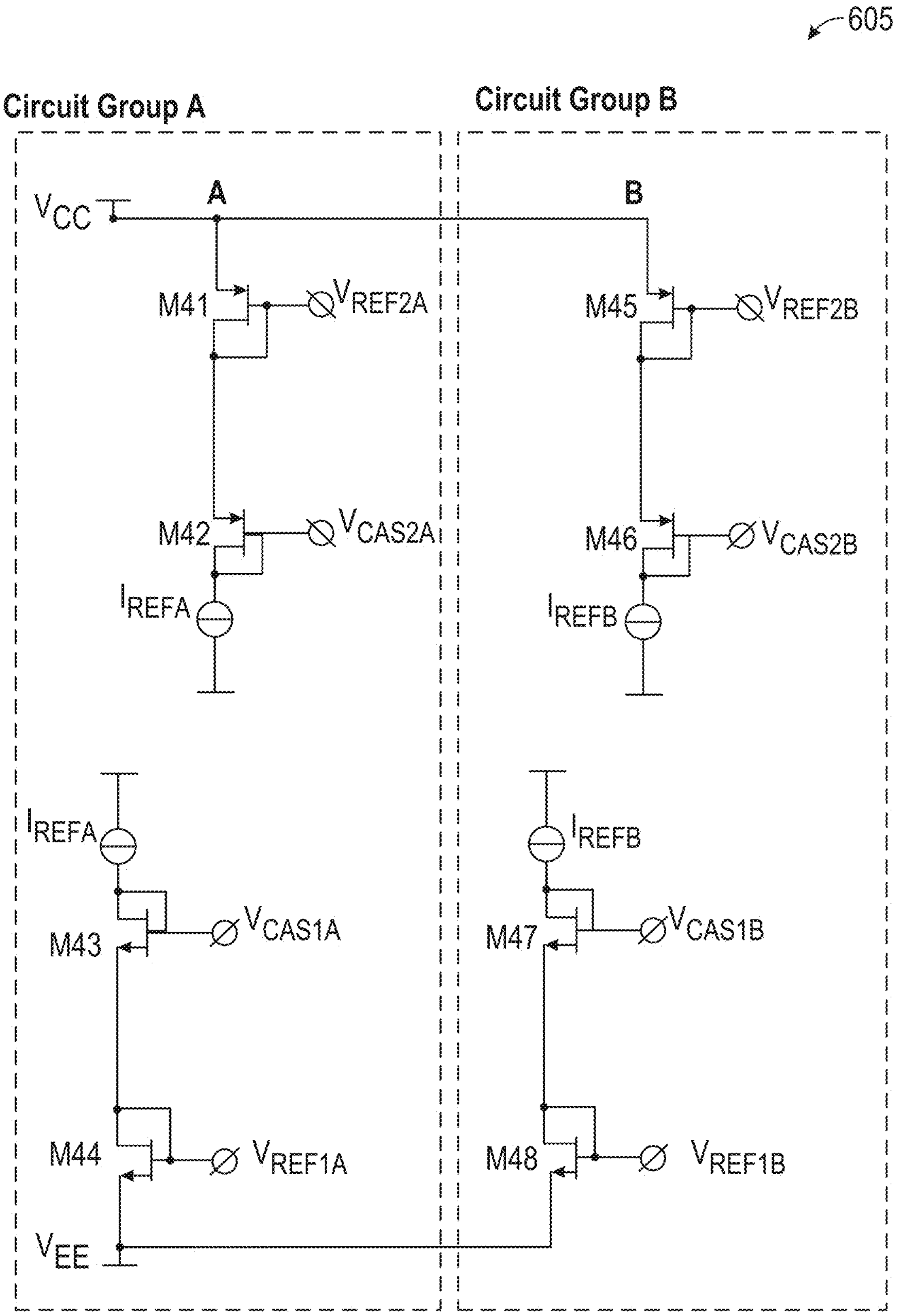
FIG. 7A is a circuit diagram illustrating A-B handoff circuits associated with the write driver circuit of FIG. 6, in accordance with some embodiments of this disclosure.

High-speed A-B handoff circuits 605 are separately illustrated in FIG. 7A, in accordance with some embodiments of this disclosure. Circuit group A of handoff circuits 605 controls the write current ($I_W$) and OSA current ($I_{OSA}$) for positive/rising transitions, and circuit group B controls the write current ($I_W$) and OSA current ($I_{OSA}$) for negative/falling transitions (the transition graphs showing rising and falling transitions are in FIG. 7B). Circuit group A comprises upper PMOS transistors M41 and M42, and lower NMOS transistors M43 and M44. Circuit group B comprises upper PMOS transistors M45 and M46, and lower NMOS transistors M47 and M48. In one non-limiting example, all devices of high-speed A-B handoff circuits 605 are low voltage high speed devices.

Figure 7B:
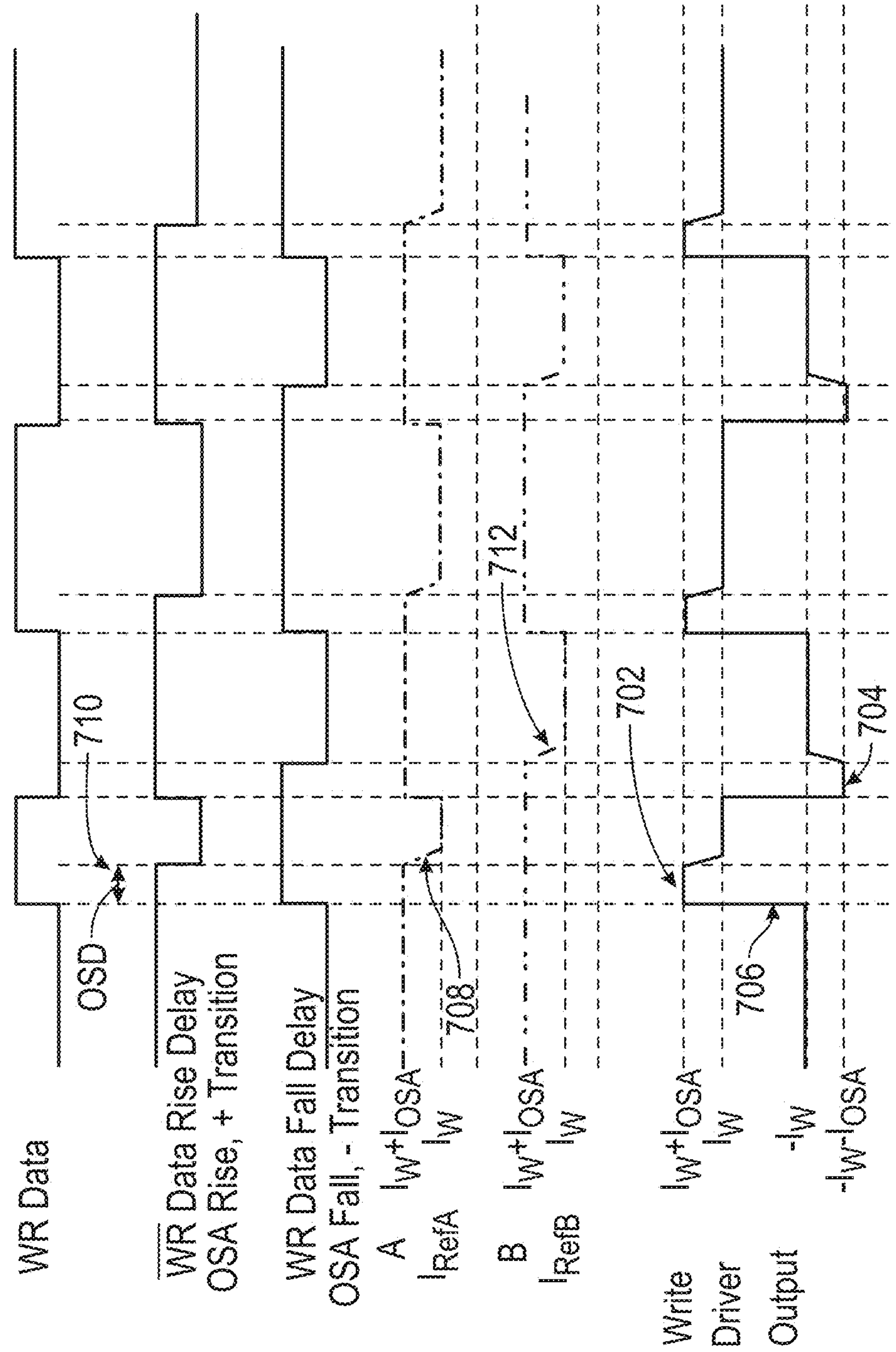
FIG. 7B is a timing diagram showing various signals associated with the A-B handoff circuits of FIG. 7A, in accordance with some embodiments of this disclosure.

The source of upper A transistor M41 is tied to voltage supply $V_{CC}$. The gate and drain of upper A transistor M41 are tied to reference voltage source $V_{REF2A}$. The source of upper A transistor M42 is tied to reference voltage source $V_{REF2A}$ via the drain and gate of upper A transistor M41. The gate and drain of upper A transistor M42 are tied to voltage source $V_{CAS2A}$, and reference current source $I_{REFA}$ is coupled to the drain of transistor M42. $I_{REFA}$ is the upper "A" $I_{W+OSA}$ input 607 of write driver circuit 600, and as can be seen in FIG. 7B, transitions between $I_W$+$I_{OSA}$ and $I_W$. In one non-limiting example, all reference voltages are generated by reference currents $I_{REFA}$ and $I_{REFB}$ and the devices' diode connection with the gate connected to the drain.

The source of lower A transistor M44 is tied to voltage supply $V_{EE}$. The gate and drain of lower A transistor M44 are tied to reference voltage source $V_{REF1A}$. The source of lower A transistor M43 is tied to reference voltage source $V_{REF1A}$ via the drain and gate of lower A transistor M44. The gate and drain of lower A transistor M43 are tied to voltage source $V_{CAS1A}$, and reference current source $I_{REFA}$ is coupled to the drain of transistor M43. $I_{REFA}$ is the lower "A" $I_{W+OSA}$ input 607 of write driver circuit 600, and as can be seen in FIG. 7B, transitions between $I_W$+$I_{OSA}$ and $I_W$.

The source of upper B transistor M45 is tied to voltage supply $V_{CC}$. The gate and drain of upper B transistor M45 are tied to reference voltage source $V_{REF2B}$. The source of upper B transistor M46 is tied to reference voltage source $V_{REF2B}$ via the drain and gate of upper B transistor M45. The gate and drain of upper B transistor M46 are tied to voltage source $V_{CAS2B}$, and reference current source $I_{REFB}$ is coupled to the drain of transistor M46. $I_{REFB}$ is the upper "B" $I_{W+OSA}$ input 607 of write driver circuit 600, and as can be seen in FIG. 7B, transitions between $I_W$+$I_{OSA}$ and $I_W$.

The source of lower B transistor M48 is tied to voltage supply $V_{EE}$. The gate and drain of lower B transistor M48 are tied to reference voltage source $V_{REF1B}$. The source of lower B transistor M47 is tied to reference voltage source $V_{REF1B}$ via the drain and gate of lower B transistor M48. The gate and drain of lower B transistor M47 are tied to voltage source $V_{CAS1B}$, and reference current source $I_{REFB}$ is coupled to the drain of transistor M47. $I_{REFB}$ is the lower "B" $I_{W+OSA}$ input 607 of write driver circuit 600, and as can be seen in FIG. 7B, transitions between $I_W$+$I_{OSA}$ and $I_W$.

FIG. 7B is a timing diagram showing various signals associated with A-B handoff circuits 605 of FIG. 7A, in accordance with some embodiments of this disclosure. FIG. 7B illustrates the WR data signal, the WR' data rise delay signal (OSA rise, positive transition); the WR data fall delay signal (OSA fall, negative transition), the $I_{REFA}$ and $I_{REFB}$ signals that are output by A-B handoff circuits 605, and the resulting write driver current that is output on lines 610A and 610B.

A-B handoff circuits 605 set up for the overshoot 702 and the undershoot 704 (negative polarity of overshoot 702) in the write driver output. That is, A-B handoff circuits 605 are setting up the adaptive cascode bias 604. Essentially, the $I_{REFA}$ waveform is being loaded on the A side to have $I_{W+OSA}$ preset, so that the addition of the $I_W$ and $I_{OSA}$ currents is provided. When the write driver output switches at 706, the $I_W$+$I_{OSA}$ input is set by $I_{REFA}$. A digital delay circuit that is programmable in terms of overshoot duration (OSD) provides a delay in the transition 708 in the "A" waveform from $I_{W+IOSA}$ to $I_W$. The transition rate from $I_{W+IOSA}$ to $I_W$ is set and programmably controlled by $V_{REF}$. Changing the overshoot duration OSD can change the overshoot width 710. While the A side is discharging, the B side is getting loaded for the negative transition 712. Then B is discharged while A is loading, and it alternates back and forth. It is essentially a handoff between the A and B sides to provide a current mirror circuit. Internal delays are provided so that B is not loaded while a transition 706 in the write driver output is occurring, which could cause an undershoot. A slight delay for loading the B circuit is needed until it is completely switched over to A, and vice-versa, or undershoots could be created. Programmable control of the rise/fall transition rate is provided by two design considerations: variable impedance at the gate of the driving transistors and control of $V_{REF}$.

Programmable Termination Section 606

The output write current from write driver circuit 600 ("Write Driver Output" waveform of FIG. 7B) is provided as a differential signal on lower and upper output lines 610A and 610B from inductors L1 and L3 to transmission line 312 (upper line 610B), and from inductors L2 and L4 to transmission line 312 (lower line 610A). Programmable termination section 606 is coupled to output lines 610A and 610B. Programmable resistance ½$R_{OUT}$ is coupled to each output write current line 610A and 610B, which in turn are connected in series with programmable reference voltage $V_{REF}$. As described above, $R_{OUT}$ is a programmable passive impedance created by passive resistors and transistor switches to set the $R_{OUT}$ value. $V_{REF}$ is a regulated voltage that is predetermined (programmed).

$I_{W+OSA}$ Input Section 607

As described above, programmable $I_{W+OSA}$ inputs 607 are provided by A-B handoff circuits 605 (FIG. 7A), and transition between $I_W$+$I_{OSA}$ and $I_W$ (FIG. 7B).

Stationary Cascode Section 608

Stationary cascode section 608 comprises high voltage PMOS and NMOS devices that are "stationary" in that they are not switching. Rather, they are setting up a cascode pass through current as described below.

Upper stationary cascode section 608B comprises high voltage PMOS transistors M31, M32, M33, M34 and M35, whose gates are commonly coupled to adaptive cascode bias current source $I_{W+OSA}$ 604. The sources of upper cascode transistors M31 and M32 are coupled to the drain of upper data switching transistor M27. The drain of upper cascode transistor M31 is tied to one end of inductor L1, and the drain of upper cascode transistor M32 is tied to the other end of inductor L1 (which is tied to output write current line 610B). The source of upper cascode transistor M33 is coupled to the tied gate and drain of upper switching transistor M28. The drain of upper cascode transistor M33 is coupled to adaptive cascode bias current source $I_{W+OSA}$ 604. The sources of upper cascode transistors M34 and M35 are coupled to the drain of upper data switch transistor M29. The drain of upper cascode transistor M35 is tied to one end of inductor L2, and the drain of upper cascode transistor M34 is tied to the other end of inductor L2 (which is tied to output write current line 610A).

Lower stationary cascode section 608A comprises high voltage NMOS transistors M36, M37, M38, M39 and M40, whose gates are commonly coupled to adaptive cascode bias current source $I_{W+OSA}$ 604. The sources of lower cascode transistors M36 and M37 are coupled to the drain of lower data switch transistor M22. The drain of lower cascode transistor M36 is tied to one end of inductor L3, and the drain of lower cascode transistor M37 is tied to the other end of inductor L3 (which is tied to output write current line 610B). The source of lower cascode transistor M38 is coupled to the tied gate and drain of lower switch transistor M23. The drain of lower cascode transistor M38 is coupled to adaptive cascode bias current source $I_{W+OSA}$ 604. The sources of lower cascode transistors M39 and M40 are coupled to the drain of lower data switch transistor M24. The drain of lower cascode transistor M40 is tied to one end of inductor L4, and the drain of lower cascode transistor M39 is tied to the other end of inductor L4 (which is tied to output write current line 610A).

Distributed Inductive Compensation Section 609

Spiral inductors L1, L2, L3 and L4 comprise distributed inductive compensation section 609, and provide distributed inductive compensation to the write current supplied on write current output lines 610A and 610B. In particular, the spiral inductors L1, L2, L3 and L4 distribute the capacitive load associated with the larger, slower cascode devices of stationary cascode section 608. In some embodiments, as many as six spiral inductors may be connected in series between the drains in each cascode transistor pair (i.e., M31-M32; M34-M35; M36-M37; M39-M40).

Figure 8:
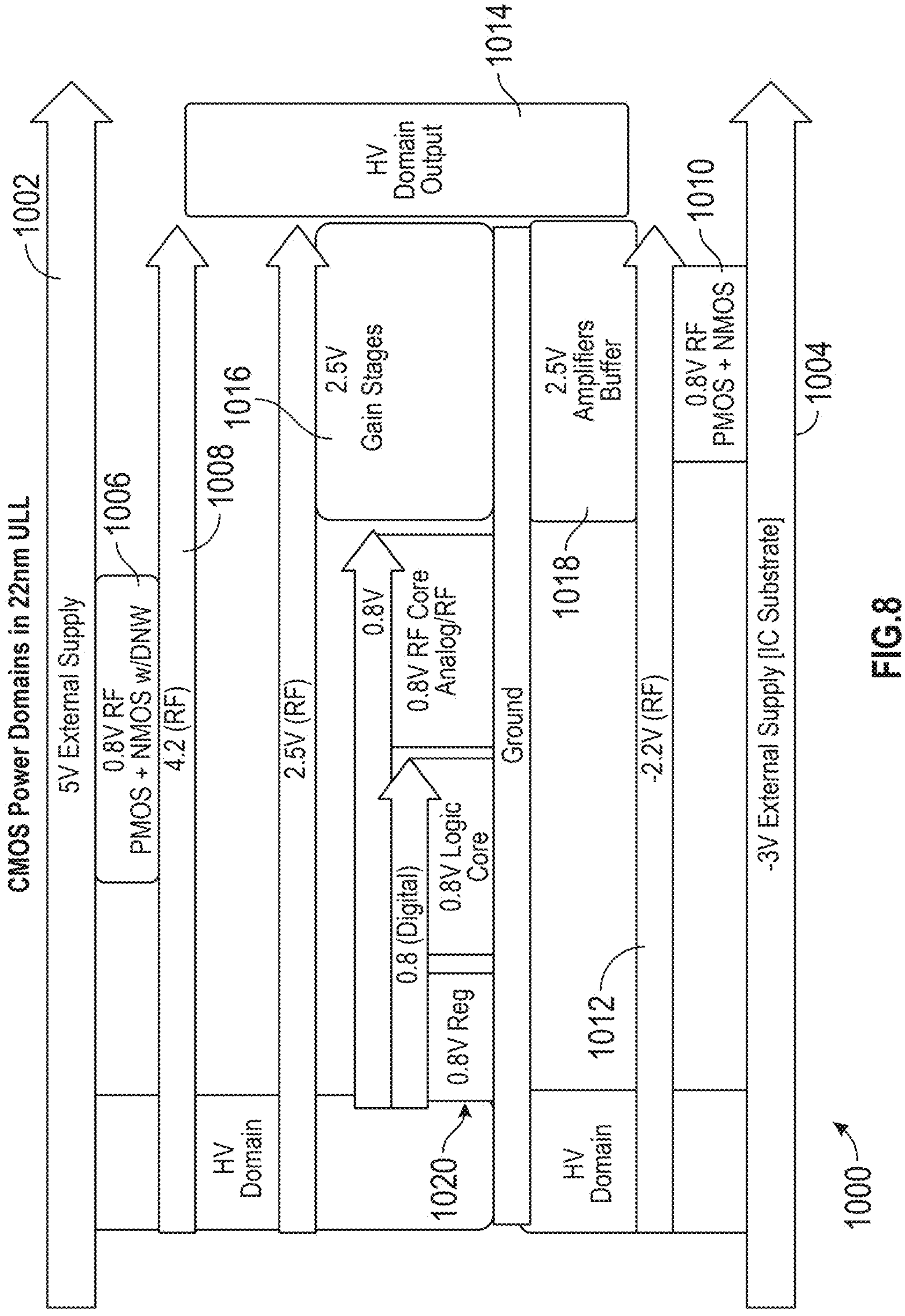
FIG. 8 is a diagram of an exemplary power domain for low voltage and high voltage CMOS devices, in accordance with some embodiments of this disclosure.

In one implementation, in accordance with some embodiments of this disclosure, 22 nm ultra-low leakage (ULL) devices are utilized. FIG. 8 is a diagram 1000 of an exemplary power domain for such 22 nm ULL devices and other devices in accordance with some embodiments of this disclosure. At the top of the power domain is a 5V external supply ($V_{CC}$) 1002, and at the bottom of the power domain is a −3V external supply ($V_{EE}$) 1004. Thus, a total of 8V (the spread from −3V to 5V) can be supported by power domain 1000. As previously described, one aspect of this disclosure utilizes low voltage (0.8V) CMOS devices. These low voltage devices include, for example, in the top (positive) half, devices 1006 such as data switches 603 and the top devices of level shifter 602. As can be seen in FIG. 8, the voltage for these top low voltage PMOS devices is provided between the 5V external supply 1002 and a 4.2 voltage level 1008. In the bottom (negative) half, these devices 1010 include digital data input 601 and data switches 603. As can be seen in FIG. 8, the low voltage (0.8V) for bottom NMOS devices 1010 is provided between the −3V external supply 1004 and a −2.2V voltage level 1012.

High voltage (i.e., 2.5V) devices are also utilized in accordance with some embodiments of this disclosure. These devices include, for example, the NMOS and PMOS devices of adaptive cascode bias 604 and stationary cascode 608. As can be seen in FIG. 8, the voltage for these devices in the high voltage (HV) domain 1014 may be provided between 2.5V and ground (positive) (gain stages 1016), and between ground and −2.2V (negative) (devices 1018). As can also be seen in FIG. 8, another power domain between ground and 0.8V may be provided for digital devices 1020 such as a regulator, logic core and certain RF core analog/RF devices.

Figure 9A:
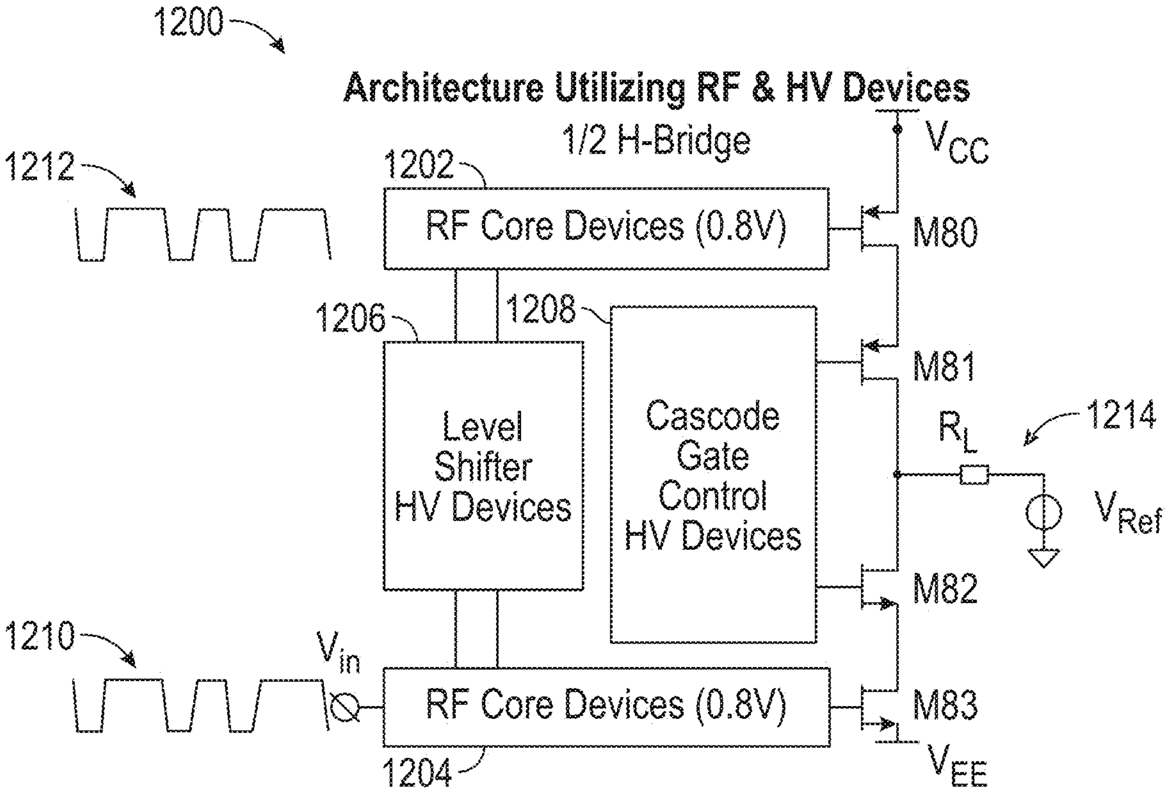
FIG. 9A is a conceptual diagram illustrating a high-level architecture of a write driver, in accordance with some embodiments of this disclosure.

FIG. 9A is a conceptual diagram illustrating the high-level architecture of a write driver 1200, in accordance with some embodiments of this disclosure. Write driver 1200 comprises top (positive) RF core devices 1202 and bottom (negative) RF core devices 1204. In one implementation, RF core devices 1202 and 1204 are 0.8V devices. Top RF core devices 1202 may correspond, for example, to PMOS devices M26-M30 of data switches 603B of write driver circuit 600 (FIG. 6). One PMOS device M80 of RF core devices 1202 is shown in FIG. 9A as having its source coupled to top (positive) voltage $V_{CC}$, its gate coupled to another of RF core devices 1202, and its drain coupled to the source of PMOS device M81 of cascode gate control HV devices 1208. Low voltage PMOS device M80 may correspond, for example, to low voltage PMOS device M27 of circuit 600.

Bottom RF core devices 1204 may correspond, for example, to NMOS devices M13, M14 of digital data input 601 and NMOS devices M21-M25 of data switches 603A of write driver circuit 600 (FIG. 6). One NMOS device M83 of RF core devices 1204 is shown in FIG. 9A as having its source coupled to bottom (negative) voltage $V_{EE}$, its gate coupled to another of RF core devices 1204, and its drain coupled to the source of NMOS device M82 of cascode gate control HV devices 1208. Low voltage NMOS device M83 may correspond, for example, to low voltage NMOS device M22 of circuit 600.

Write driver 1200 further comprises level shifter circuit 1206. Level shifter circuit 1206 corresponds to level shifter 602 of write driver circuit 600 (FIG. 6) and functions to fold lower-level signals 1210 of the bottom ($V_{EE}$) devices to higher level signals 1212 of the upper ($V_{CC}$) devices. Thus, level shifter circuit 1206 provides parallel higher-level signals 1212 to lower-level signals 1210, matching the signal on both the positive and negative, and essentially mimics an H-bridge effect. Level shifter 1206, in one implementation, comprises high voltage (HV) devices such as HV NMOS transistors M15 and M16, as well as low voltage PMOS devices M17-M20.

Write driver 1200 further comprises cascode gate control 1208. Cascode gate control 1208 corresponds to stationary cascode 608 and adaptive cascode bias 604 of write driver circuit 600 (FIG. 6) and functions to set up a cascode pass through current. Cascode gate control 1208 comprises, in one implementation, HV PMOS devices M31-M35 and HV NMOS devices M36-M40 (FIG. 6). One PMOS device M81 of cascode gate control HV devices 1208 is shown in FIG. 9A as having its source coupled to the drain of PMOS device M80 of RF core devices 1202, its gate coupled to another of cascode gate control HV devices 1208, and its drain coupled to the drain of NMOS device M82 of cascode gate control HV devices 1208. One NMOS device M82 of cascode gate control HV devices 1208 is shown in FIG. 9A as having its source coupled to the drain of NMOS device M83 of RF core devices 1204, its gate coupled to another of cascode gate control HV devices 1208, and its drain coupled to the drain of PMOS device M81 of cascode gate control HV devices 1208.

Write driver 1200 further comprises programmable termination 1214. The output write current is provided on the drains of HV PMOS transistor M81 and HV NMOS transistor M82. Programmable termination 1214 is coupled to the output write current. Programmable termination 1214 comprises programmable resistance $R_L$ connected in series with programmable reference voltage $V_{Ref}$.

Figure 9B:
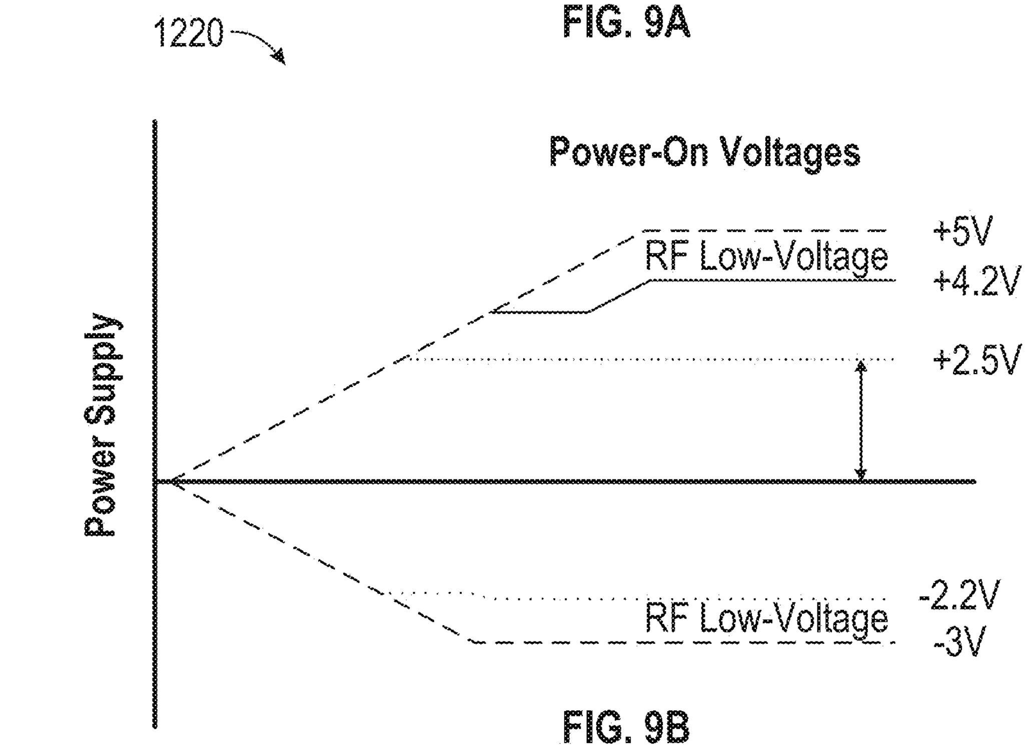
FIG. 9B is a graph showing the power-on voltages for components of the write driver architecture of FIG. 9A, in accordance with some embodiments of this disclosure

FIG. 9B is a graph 1220 showing the power-on voltages for components of the write driver architecture 1200 of FIG. 9A. As also explained with reference to FIG. 8, the write driver architecture 1200 has a top positive voltage $V_{CC}$ of +5V, for example, and a bottom negative voltage $V_{EE}$ of −3V, for example, for a total voltage spread of 8V. Voltage regulation may be provided for the top (5V) and bottom (−3V) supply rails. The top low voltage (0.8V) RF devices work between 5V and 4.2V, and the bottom low voltage (0.8V) RF devices work between −3V and −2.2V. The high voltage devices work between +2.5V and 0V, and between 0V and −2.2V, and can support output and level translation. As can be seen in FIG. 9A, there is supply/device separation between RF core devices 1202/1204 and cascode gate control devices 1208. Cascode gate control devices 1208 operate to maintain gate voltage to keep RF core devices 1202/1204 in specified operating parameters.

Figure 10:
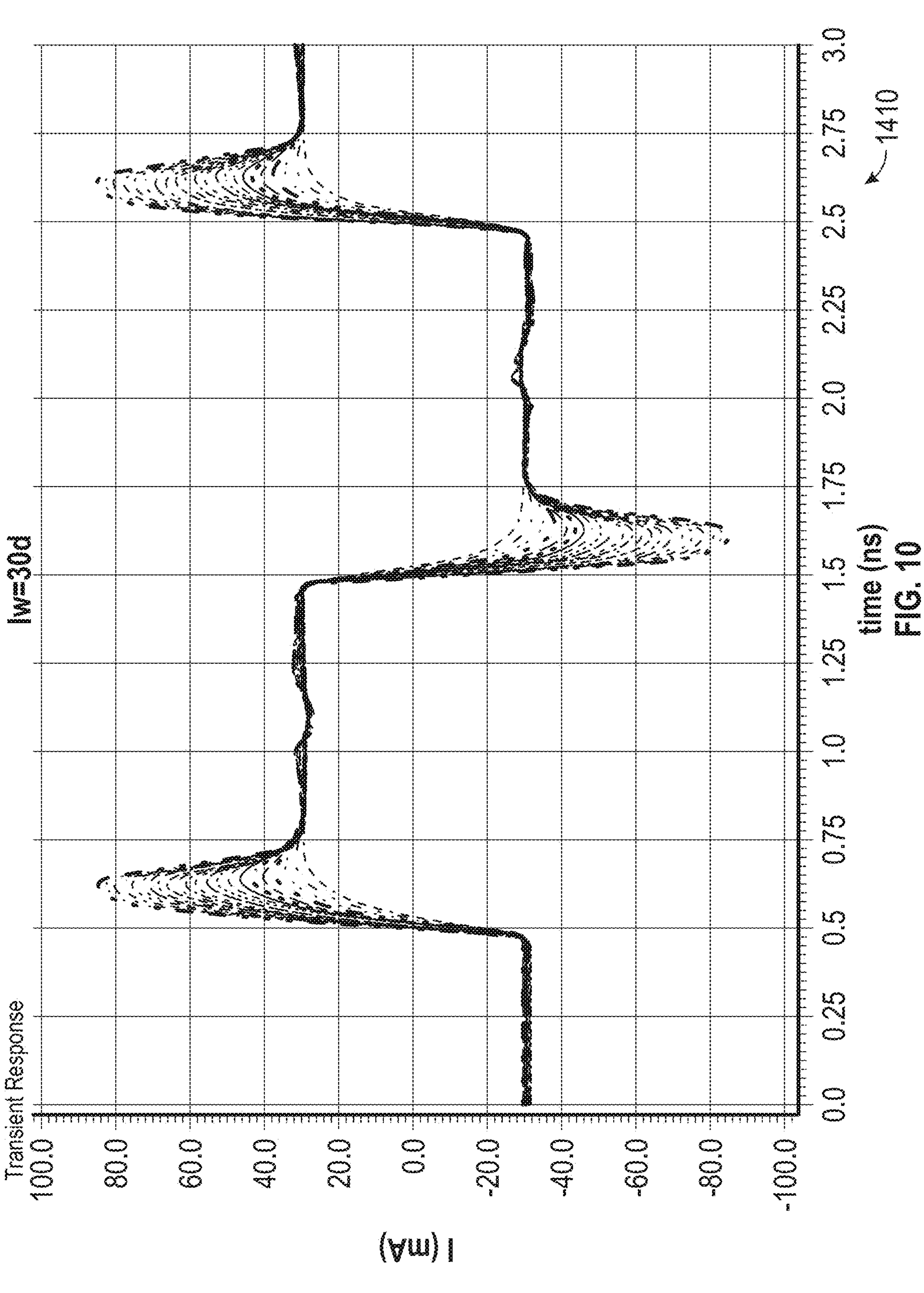
FIG. 10 is a graph showing a sample write current waveform, having the operating parameters Iw: 30d; OSA: 0d-63d; OSD: 15d; OSDRng: 0d, in accordance with some embodiments of this disclosure.
Figure 11:
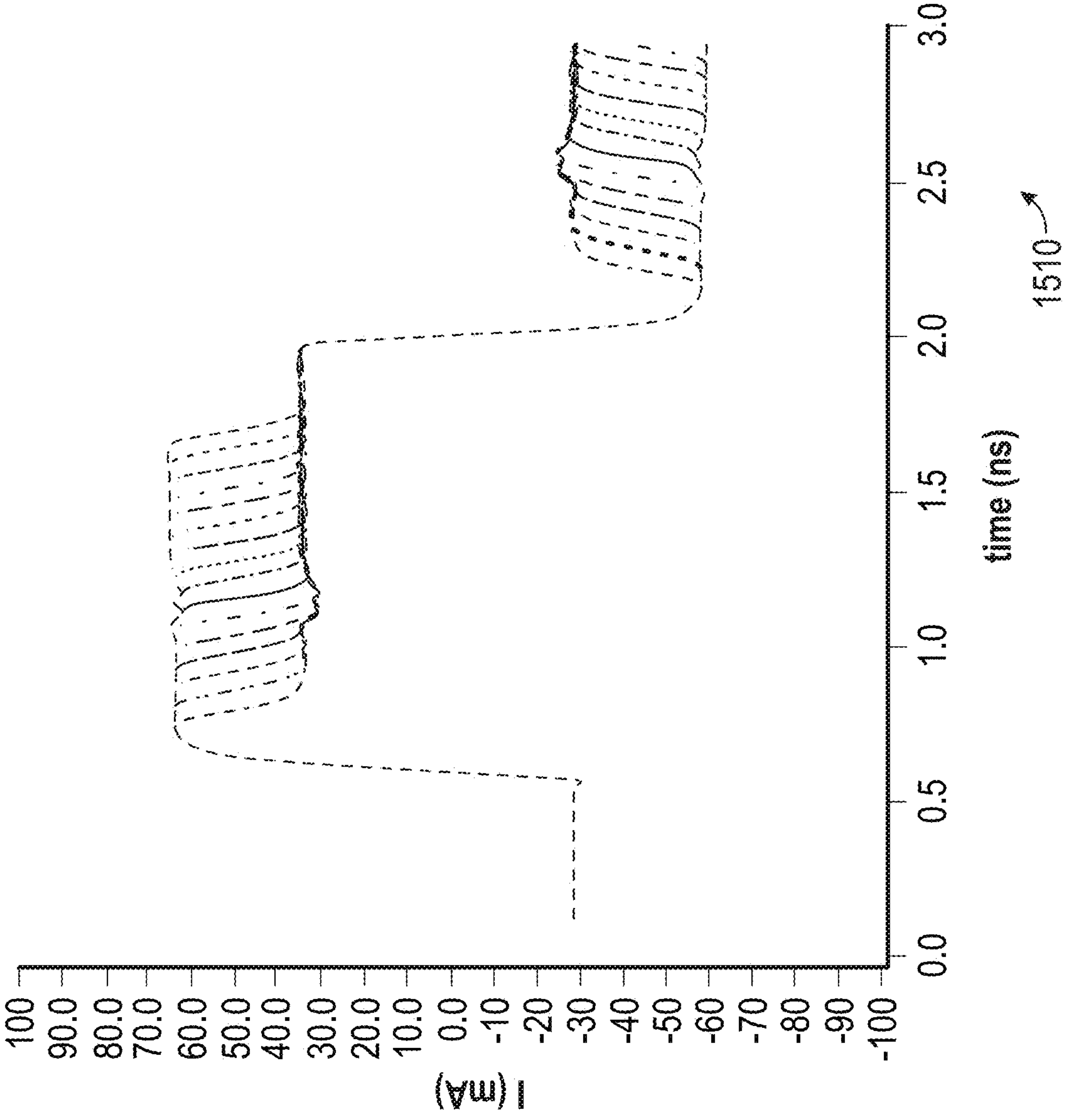
FIG. 11 is a graph showing a sample write current waveform, having the operating parameters Iw: 30d; OSA: 30d; OSD: 0d-15d; OSDRng: 0d-1d, in accordance with some embodiments of this disclosure.

In FIGS. 10-11, “d” is the digital bit settings for a square waveform; “Iw” is the baseline write current; “OSA” is the overshoot amplitude; and OSD is the overshoot duration.

FIG. 10 is a graph showing a sample write current waveform 1410, with current (mA) on the y-axis and time (ns) on the x-axis, in accordance with some embodiments of this disclosure. The parameters that generate write current waveform 1400 include Iw: 30d; OSA: 0d-63d; OSD: 15d; OSDRng: 0d, in accordance with some embodiments of this disclosure.

FIG. 11 is a graph showing a sample write current waveform 1510, with current (mA) on the y-axis and time (ns) on the x-axis, in accordance with some embodiments of this disclosure. The parameters that generate write current waveform 1400 include Iw: 30d; OSA: 30d; OSD: 0d-15d; OSDRng: 0d-1d, in accordance with some embodiments of this disclosure.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one example, the read channel and disk controller are implemented as separate integrated circuits, and in an alternative example they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one example, the control circuitry comprises a microprocessor executing instructions, the instructions being operable to cause the microprocessor to perform the flow diagrams described herein. The instructions may be stored in any computer-readable medium. In one example, they may be stored on a non-volatile semiconductor memory external to the microprocessor, or integrated with the microprocessor in a SOC. In another example, the instructions are stored on the disk and read into a volatile semiconductor memory when the disk drive is powered on. In yet another example, the control circuitry comprises suitable logic circuitry, such as state machine circuitry.

A disk drive may include a magnetic disk drive, an optical disk drive, etc. In addition, while the above examples concern a disk drive, this disclosure is not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another or may be combined in various ways. All possible combinations and subcombinations are intended to fall within the scope of this disclosure. In addition, certain method, event, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed implementations. The example systems and components described herein may be configured differently than described. For example, elements may be added to, removed from, or rearranged compared to the disclosed example embodiments.

While certain implementation examples have been described, these examples are presented by way of example only, and are not intended to limit the scope of this disclosure. Thus, nothing in the foregoing description is intended to imply that any feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the embodiments disclosed herein.

What is claimed is:

1. A data storage device comprising:

a magnetic medium;

a head configured to be actuated over the magnetic medium, the head comprising a write element; and a write driver configured to generate a write current to be applied to the write element, the write driver comprising:

a data switch section configured to switchably output a low-level signal and a high-level signal, the data switch section comprising a low voltage complementary metal-oxide-semiconductor (CMOS) device; and a stationary cascode section configured to receive the low-level signal and the high-level signal from the data switch section, the stationary cascode section comprising a high voltage CMOS device configured to generate a cascode pass through current.

2. The data storage device of claim 1, further comprising:

a digital data input section configured to receive a low-level digital data input, the digital data input section comprising a low voltage CMOS device; and a level shifter section configured to fold the low-level digital data input to a high-level digital data input, the level shifter section comprising a low voltage CMOS device and a high voltage CMOS device.

3. The data storage device of claim 2, further comprising:

a write driver receiver configured to provide the low-level digital data input to the digital data input section, the write driver receiver configured to receive differential PECL signals and generate positive differential logic signals and negative differential logic signals.

4. The data storage device of claim 3, wherein the write driver receiver comprises a low voltage CMOS device and a high voltage CMOS device.

5. The data storage device of claim 1, further comprising:

a distributed inductive compensation section configured to distribute a capacitive load associated with the high voltage CMOS device of the stationary cascode section.

6. The data storage device of claim 5, wherein the distributed inductive compensation section comprises a plurality of spiral inductors.

7. The data storage device of claim 5, further comprising:

a programmable termination section coupled to the distributed inductive compensation section, the programmable termination section comprising a programmable resistance ROUT coupled in series to a programmable reference voltage VREF.

8. The data storage device of claim 1, further comprising:

an adaptive cascode bias section configured to apply a programmable $I_{W+OSA}$ adaptive cascode bias current to the high voltage CMOS device of the stationary cascode section.

9. The data storage device of claim 8, further comprising:

an A-B handoff circuit configured to generate the programmable $I_{W+OSA}$ adaptive cascode bias current, the A-B handoff circuit comprising a CMOS device.

10. The data storage device of claim 1, further comprising:

a preamplifier, the preamplifier comprising the write driver, a low-level driver, a level-shifter section, a high-level driver, and a write driver receiver.

11. A preamplifier comprising:

a write driver receiver configured to provide a low-level digital data input;

a low-level driver configured to receive the low-level digital data input from the write driver receiver, the low-level driver comprising a digital data input section and a lower data switch section, the digital data input section and the lower data switch section comprising a low voltage complementary metal-oxide-semiconductor (CMOS) device;

a level shifter configured to fold the low-level digital data input to a high-level digital data input;

a high-level driver configured to receive the high-level digital data input from the level shifter, the high-level driver comprising an upper data switch section comprising a low voltage CMOS device; and a write driver coupled to the low-level driver and to the high-level driver and configured to generate a write current, the write driver comprising a high voltage CMOS device.

12. The preamplifier of claim 11, wherein the write driver further comprises:

an upper stationary cascode section configured to receive the high-level digital data input from the high-level driver; and a lower stationary cascode section configured to receive the low-level digital data input from the low-level driver, wherein the upper and the lower stationary cascode sections comprise a high voltage CMOS device configured to generate a cascode pass through current.

13. The preamplifier of claim 12, wherein the high voltage CMOS device of the upper stationary cascode section and the low voltage CMOS device of the high-level driver comprise p-type metal-oxide-semiconductor (PMOS) transistors, and wherein the high voltage CMOS device of the lower stationary cascode section and the low voltage CMOS device of the low-level driver comprise n-type metal-oxide-semiconductor (NMOS) transistors.

14. The preamplifier of claim 12, wherein the level shifter comprises:

a low voltage p-type metal-oxide-semiconductor (PMOS) device; and a high voltage n-type metal-oxide-semiconductor (NMOS) device coupled between the low-level driver and the low voltage PMOS device.

15. The preamplifier of claim 12, wherein the write driver further comprises:

a distributed inductive compensation section configured to distribute a capacitive load associated with the high voltage CMOS device of the upper and the lower stationary cascode sections.

16. The preamplifier of claim 15, wherein the distributed inductive compensation section comprises a plurality of spiral inductors.

17. The preamplifier of claim 12, wherein the write driver comprises:

an adaptive cascode bias section configured to apply a programmable $I_{W+OSA}$ adaptive cascode bias current to the high voltage CMOS device of the upper and the lower stationary cascode sections.

18. The preamplifier of claim 11, wherein the preamplifier is configured for use in a data storage device having a magnetic medium and a head having a write element configured to be actuated over the magnetic medium.

19. A method for generating a write current to be applied to a write element of a head configured to be actuated over a magnetic medium of a data storage device, the method comprising:

switchably outputting, by a data switch section comprising a low voltage complementary metal-oxide-semiconductor (CMOS) device, a low-level signal and a high-level signal;

receiving, by a stationary cascode section comprising a high voltage CMOS device, the low-level signal and the high-level signal; and generating, by the stationary cascode section, a cascode pass through current.

20. The method of claim 19, further comprising:

receiving, by a digital data input section comprising a low voltage CMOS device, a low-level digital data input; and shifting, by a level shifter comprising a low voltage CMOS device and a high voltage CMOS device, the low-level digital data input to a high-level digital data input.

21. The method of claim 20, further comprising:

distributing, by a plurality of spiral inductors, a capacitive load associated with the high voltage CMOS device of the stationary cascode section.

22. The method of claim 21, further comprising:

applying, by an adaptive cascode bias section, a programmable $I_{W+OSA}$ adaptive cascode bias current to the high voltage CMOS device of the stationary cascode section.

* * * * *